W. H. MEADOWS.
CULTIVATOR ATTACHMENT.
APPLICATION FILED SEPT. 18, 1917.
1,281,989.
Patented Oct. 15, 1918.
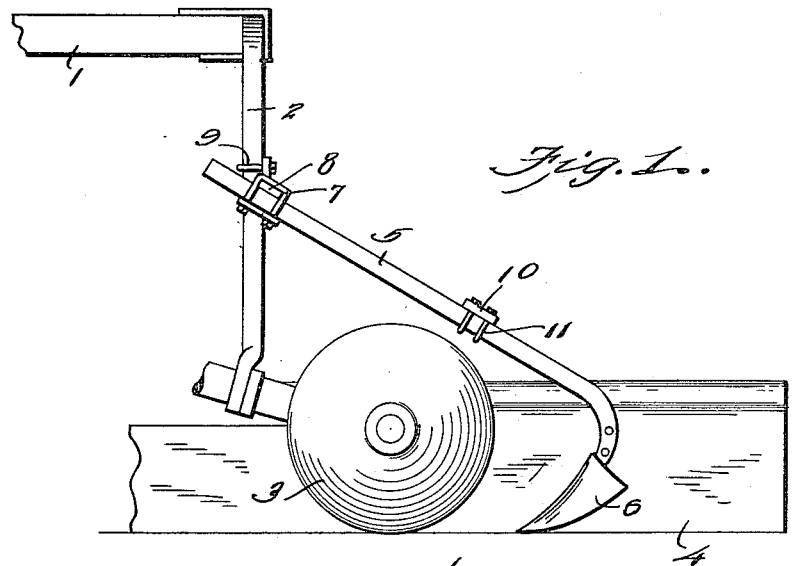
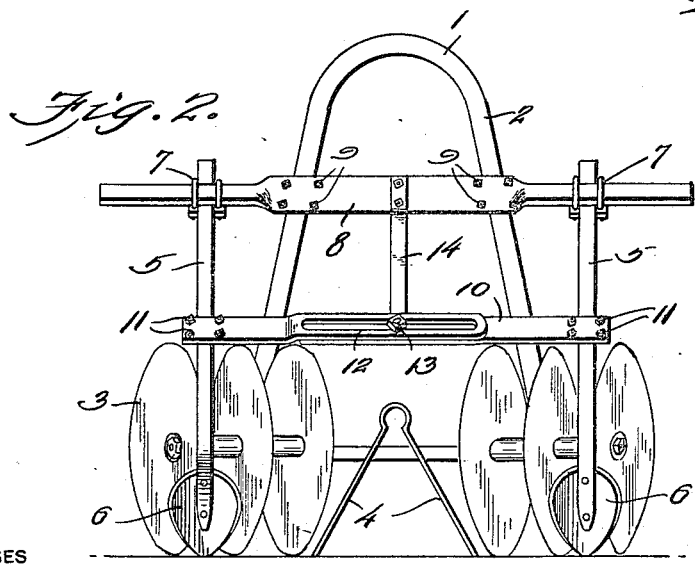
WITNESSES
INVENTOR
William H. Meadows
BY
ATTORNEY

UNITED STATES PATENT OFFICE.

WILLIAM H. MEADOWS, OF BYERS, TEXAS.

CULTIVATOR ATTACHMENT.

1,281,989.	Specification of Letters Patent.	Patented Oct. 15, 1918.

Application filed September 18, 1917. Serial No. 191,992.

*To all whom it may concern:*

Be it known that I, WILLIAM H. MEADOWS, a citizen of the United States, residing at Byers, in the county of Clay and State of Texas, have invented certain new and useful Improvements in Cultivator Attachments, of which the following is a specification.

This invention relates to new and useful improvements in cultivators and the principal object of the invention is to provide an attachment for a disk cultivator for pulverizing the soil in a more thorough manner than when the disks are used alone.

Another object of the invention is to pulverize the soil along the furrow made by the disk so the same will not dry out as when left by the disk.

A further object of the invention is to place a hoe or plow back of the disk so the same will throw the dirt from the ridge left by the disk around the plants in the row.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:

Figure 1 is a side view showing part of the cultivator with my attachment thereon.

Fig. 2 is a rear view.

In these figures, 1 represents one of the supporting beams of the cultivator to which is connected the yoke 2 which carries the disks 3. 4 is the U shaped shield for preventing the plants being covered by the dirt turned up by the cultivator. This forms no part of my invention and will not be described further.

My invention consists in an attachment adapted to be secured to the cultivator and provided with hoes to follow the disks to more thoroughly pulverize the soil and to distribute the dirt left in ridges by the disks, around the plant.

The attachment comprises a pair of beams 5 having their lower ends curving downward and forwardly and receiving the hoes 6. The upper ends of these beams are adjustably connected by the clamps 7 to a cross bar 8 which is detachably connected to the yoke 2 by the clamps 9. This beam 8 has its ends projecting beyond the yoke and said ends are reduced in size to receive the clamps 7. The beams 5 are also connected together by means of an adjustable bar 10, which is secured to the beams by means of the clamps 11 and the two parts of said beam are connected together by the slots 12 in one part being engaged by the bolt 13 carried by the other part. 14 is brace rod extending from the beam 10 to the back of the cultivator.

It will be seen that the beams 5 may be adjusted to follow any one of the disks. For instance, when the disks are set to throw the dirt from the plants, the hoes may be set to follow the inner disk; thus they will run in the furrow made by the said disk, and they will throw the dirt around the plants, thus leaving the plants in a rounded up bed of pulverized dirt instead of being left on a ridge having its sides cut off by the disk so that said ridge would soon become hard and dry.

It is thought from the foregoing that the advantages and novel features of my invention will be readily apparent.

I desire it to be understood that I may make slight changes in the construction and in the combination and arrangement of the several parts, provided that such changes fall within the scope of the appended claim.

I claim as my invention:

A cultivator comprising a series of disks, beams having their ends curving downwardly behind said disks, hoes secured to said curved ends, a cross beam, means for securing the same to the cultivator, means for detachably securing said beams to the cross beam and an adjustable beam connected to the hoe beams.

In testimony whereof I affix my signature in presence of two witnesses.

WILLIAM H. MEADOWS.

Witnesses:
LEO J. CURTIS,
J. A. WALLING.

Copies of this patent may be obtained for five cents each, by addressing the "Commissioner of Patents, Washington, D. C."